United States Patent [19]

Hada et al.

[11] Patent Number: 4,506,382

[45] Date of Patent: Mar. 19, 1985

[54] APPARATUS FOR DETECTING TWO-DIMENSIONAL PATTERN AND METHOD FOR TRANSFORMING THE PATTERN INTO BINARY IMAGE

[75] Inventors: Kazunari Hada, Kawasaki; Norio Fujii, Urawa; Atsushi Kawahara, Kawasaki; Toru Azuma, Tokyo; Junji Hazama, Kawasaki, all of Japan

[73] Assignee: Nippon Kogaku K.K., Tokyo, Japan

[21] Appl. No.: 370,781

[22] Filed: Apr. 21, 1982

[30] Foreign Application Priority Data

Apr. 25, 1981 [JP] Japan ................................. 56-61912

[51] Int. Cl.³ .......................... G06K 9/56; H04N 5/21
[52] U.S. Cl. .................................... 382/27; 382/41; 382/49; 382/54; 358/166; 358/167; 358/284
[58] Field of Search ...................... 382/27, 41, 49, 50, 382/51, 52, 53, 54; 358/166, 167, 282, 284

[56] References Cited

U.S. PATENT DOCUMENTS

| | | | |
|---|---|---|---|
| 3,341,814 | 9/1967 | Chow | 382/53 |
| 3,668,637 | 6/1972 | Sakai et al. | 382/51 |
| 4,003,024 | 1/1977 | Riganati et al. | 382/54 |
| 4,115,760 | 9/1978 | Ito | 382/49 |
| 4,204,232 | 5/1980 | Mizuno | 382/55 |
| 4,208,651 | 6/1980 | McMahon | 382/55 |

*Primary Examiner*—John C. Martin
*Assistant Examiner*—Michael D. Parker
*Attorney, Agent, or Firm*—Shapiro and Shapiro

[57] ABSTRACT

Two-dimensional pattern detecting apparatus provided with register for serially receiving binary signals obtained from analog signals of a two-dimensional pattern and adapted to divide the pattern into pixels and to represent the density of bright and dark for pixels by the binary signals. The apparatus further includes a processing circuit adapted to compare with predetermined patterns a pattern composed of 8 peripheral pixels of a partial area of 3×3 pixels within the two-dimensional pattern, on the basis of the binary signals stored in the register. The processing circuit outputs a binary signal of a logic value stored in said register corresponding to a central pixel of the partial area when the pattern of the 8 pixels coincides with one of said predetermined patterns, and to outputs a binary signal of a logic value prevailing in 8 binary signals stored in the register corresponding to the 8 pixels when the pattern of the 8 pixels does not coincide with any of the predetermined patterns.

4 Claims, 53 Drawing Figures

FIG. 2

| A1 | A2 | A3 |
|----|----|----|
| B1 | B2 | B3 |
| C1 | C2 | C3 |

FIG. 3A

| 1 | 1 | 1 |
|---|----|---|
| 0 | B2 | 1 |
| 0 | 1 | 1 |

FIG. 3B

| 1 | 0 | 0 |
|---|----|---|
| 0 | B2 | 1 |
| 0 | 0 | 0 |

FIG. 4A

| 0 | 0 | 1 |
|---|----|---|
| 0 | B2 | 1 |
| 1 | 1 | 1 |

| 0 | 0 | 1 |
|---|----|---|
| 0 | B2 | 1 |
| 0 | 1 | 1 |

| 1 | 1 | 0 |
|---|----|---|
| 1 | B2 | 0 |
| 0 | 0 | 0 |

FIG. 6B

| 0 | 1 | 1 |
|---|----|---|
| 0 | B2 | 1 |
| 0 | 0 | 0 |

FIG. 6C

| 0 | 0 | 0 |
|---|----|---|
| 0 | B2 | 1 |
| 0 | 1 | 1 |

FIG. 6D

| 0 | 0 | 0 |
|---|----|---|
| 1 | B2 | 0 |
| 1 | 1 | 0 |

FIG. 6E

| 0 | 0 | 1 |
|---|----|---|
| 0 | B2 | 1 |
| 1 | 1 | 1 |

FIG. 6F

| 1 | 0 | 0 |
|---|----|---|
| 1 | B2 | 0 |
| 1 | 1 | 1 |

FIG. 6G

| 1 | 1 | 1 |
|---|----|---|
| 1 | B2 | 0 |
| 1 | 0 | 0 |

FIG. 6H

| 1 | 1 | 1 |
|---|----|---|
| 0 | B2 | 1 |
| 0 | 0 | 1 |

FIG. 6I

| 1 | 1 | 1 |
|---|----|---|
| 0 | B2 | 1 |
| 0 | 0 | 0 |

FIG. 6J

| 0 | 1 | 1 |
|---|----|---|
| 0 | B2 | 1 |
| 0 | 0 | 1 |

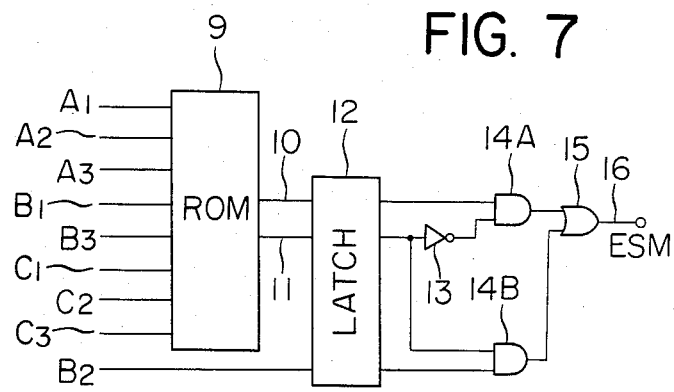

FIG. 9E  FIG. 9F  FIG. 9G  FIG. 9H
| 0 | 0 | 0 | 0 |
| 0 | 1 | 1 | 0 |
| 0 | 1 | 0 | 0 |
| 0 | 0 | 0 | 0 |
| 1 | 1 | 1 | 1 |
| 1 | 0 | 0 | 1 |
| 1 | 0 | 0 | 1 |
| 1 | 1 | 1 | 1 |
| 1 | 1 | 1 | 1 |
| 1 | 0 | 0 | 1 |
| 1 | 1 | 0 | 1 |
| 1 | 1 | 1 | 1 |
| 1 | 1 | 1 | 1 |
| 1 | 1 | 0 | 1 |
| 1 | 0 | 0 | 1 |
| 1 | 1 | 1 | 1 |
FIG. 9I  FIG. 9J
| 1 | 1 | 1 | 1 |
| 1 | 0 | 1 | 1 |
| 1 | 0 | 0 | 1 |
| 1 | 1 | 1 | 1 |
| 1 | 1 | 1 | 1 |
| 1 | 0 | 0 | 1 |
| 1 | 0 | 1 | 1 |
| 1 | 1 | 1 | 1 |
FIG. 10
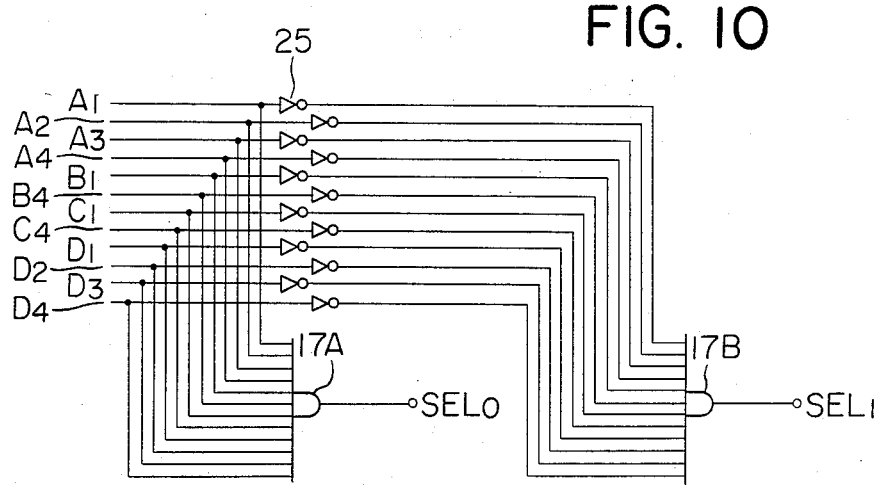
FIG. 11
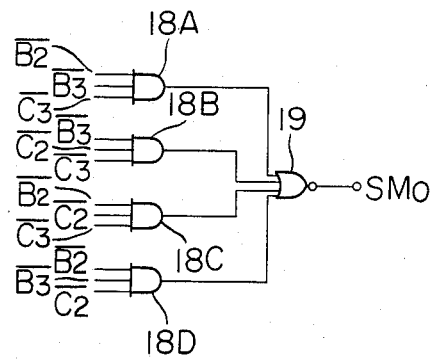
FIG. 12
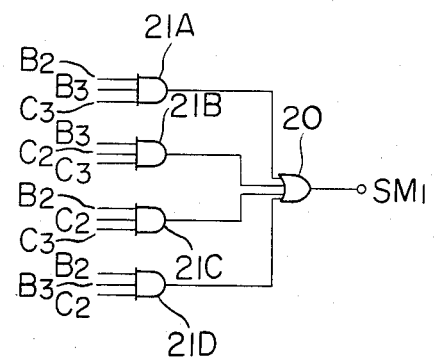

FIG. 13
| SEL0 | SEL1 | ESM | SM0 | SM1 | SMD | |
|------|------|-----|-----|-----|-----|---|
| 0 | 0 | 0 | X | X | 0 | } SMOOTHING OF EDGE NOISE |
| 0 | 0 | 1 | X | X | 1 | |
| 0 | 1 | X | X | 1 | 1 | } SMOOTHING OF ISOLATED NOISE |
| 0 | 1 | X | X | 0 | 0 | |
| 1 | 0 | X | 1 | X | 1 | |
| 1 | 0 | X | 0 | X | 0 | |
FIG. 14
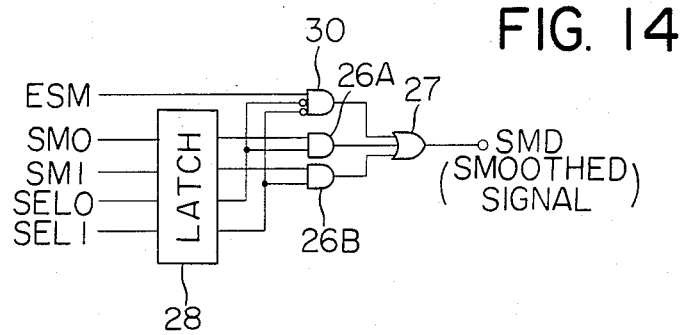
FIG. 15
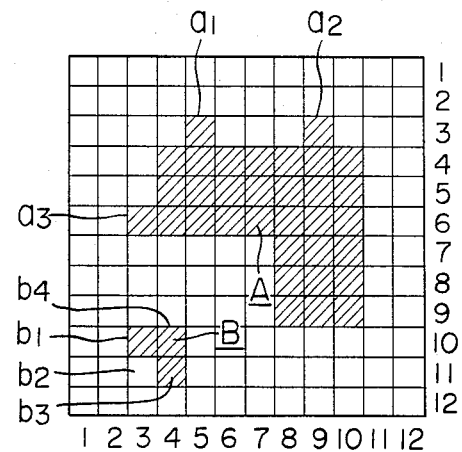

APPARATUS FOR DETECTING TWO-DIMENSIONAL PATTERN AND METHOD FOR TRANSFORMING THE PATTERN INTO BINARY IMAGE

BACKGROUND OF THE INVENTION

1. Field of the Invention

The present invention relates to an apparatus for detecting a two-dimensional pattern and a method for transforming the pattern into a binary image, for reducing the noise generated at the digitizing of analog signals obtained from an imaging pickup tube into binary signals.

2. Description of the Prior Art

A two-dimensional pattern testing apparatus has been used for detecting defects in an IC pattern formed on an IC manufacturing photomask or reticle for example by an electron beam exposure. In general such two-dimensional pattern testing apparatus decomposes a two-dimensional pattern composed of bright areas and dark areas into plural pixels and detects said pattern as binary signals respectively corresponding to said pixels. The testing of such two-dimensional IC pattern is however hindered by noise in said binary signals caused by dust deposited on the two-dimensional pattern or by fluctuations of certain parameters in the apparatus.

For the purpose of convenience, the noise in the binary signals is classified into two categories. The two-dimensional patterns include edges constituting the boundaries between light and dark area, and the noise in the binary signals corresponding to the pixels in the vicinity of such edges is called edge noise, while noise in the binary signals corresponding to the pixels distant from such edges is called isolated noise.

In order to detect defects, for example in IC patterns, it is necessary in the two-dimensional testing apparatus to smooth the binary signals, thereby erasing the edge noise and isolated noise and thus obtaining more exact binary signals. Such smoothing has to be conducted in such a manner as to avoid erroneous erasing of small patterns that may be mistaken as isolated noise. In practice, however, when it is required to erase both edge noise and isolated noise it has been necessary to sacrifice edge noise smoothing in order to maintain small isolated patterns, or to sacrifice small isolated patterns in order to effectively reduce the edge noise.

SUMMARY OF THE INVENTION

In consideration of the foregoing, the principal object of the present invention is to provide an apparatus for detecting a two-dimensional pattern and a method for transforming the pattern into a binary image, for providing an optimum digitizing pattern.

Another object of the present invention is to provide an apparatus for detecting a two-dimensional pattern and a method for transforming the pattern into a binary image, which, in digitizing analog signals obtained from an original image into binary image signals, retain the binary information of interested pixels in a partial area having predetermined pattern in said original image and for smoothing the binary image signals without losing the edges of the predetermined pattern.

Still another object of the present invention is to provide an apparatus for detecting a two-dimensional pattern and a method for transforming the pattern into a binary image, for smoothing binary image signals in such a manner as to effectively smooth the pattern edge noise formed in the digitization of the original image while retaining the small isolated patterns contained in the original image.

BRIEF DESCRIPTION OF THE DRAWINGS

FIG. 2 is a chart showing bits corresponding to $3 \times 3$ pixels to be processed by an edge noise processing circuit;

FIGS. 3A, 3B, 4A, 5A, 6A, 6B, 6C, 6D, 6E, 6F, 6G, 6H, 6I, 6J, 6K, 6L, 6M, 6N, 6O, 6P, 6Q and 6R are charts showing bit patterns corresponding to said $3 \times 3$ pixels;

FIGS. 4B, 4C, 5B and 5C are charts showing patterns in a partial area corresponding to $3 \times 3$ pixels;

FIG. 7 is a circuit diagram of an edge noise processing circuit;

FIG. 8 is a chart showing bits corresponding to $4 \times 4$ pixels to be processed by an isolated noise processing circuit;

FIGS. 9A, 9B, 9C, 9D, 9E, 9F, 9G, 9H, 9I and 9J are charts showing bit patterns corresponding to $4 \times 4$ pixels;

FIGS. 10, 11 and 12 are circuit diagrams of an isolated noise processing circuit;

FIG. 13 is a logic table of a switching circuit;

FIG. 14 is a circuit diagram of the switching circuit;

FIG. 15 is a view showing a binarized image having $12 \times 12$ pixels;

DETAILED DESCRIPTION OF THE PREFERRED EMBODIMENTS

Figure 1:
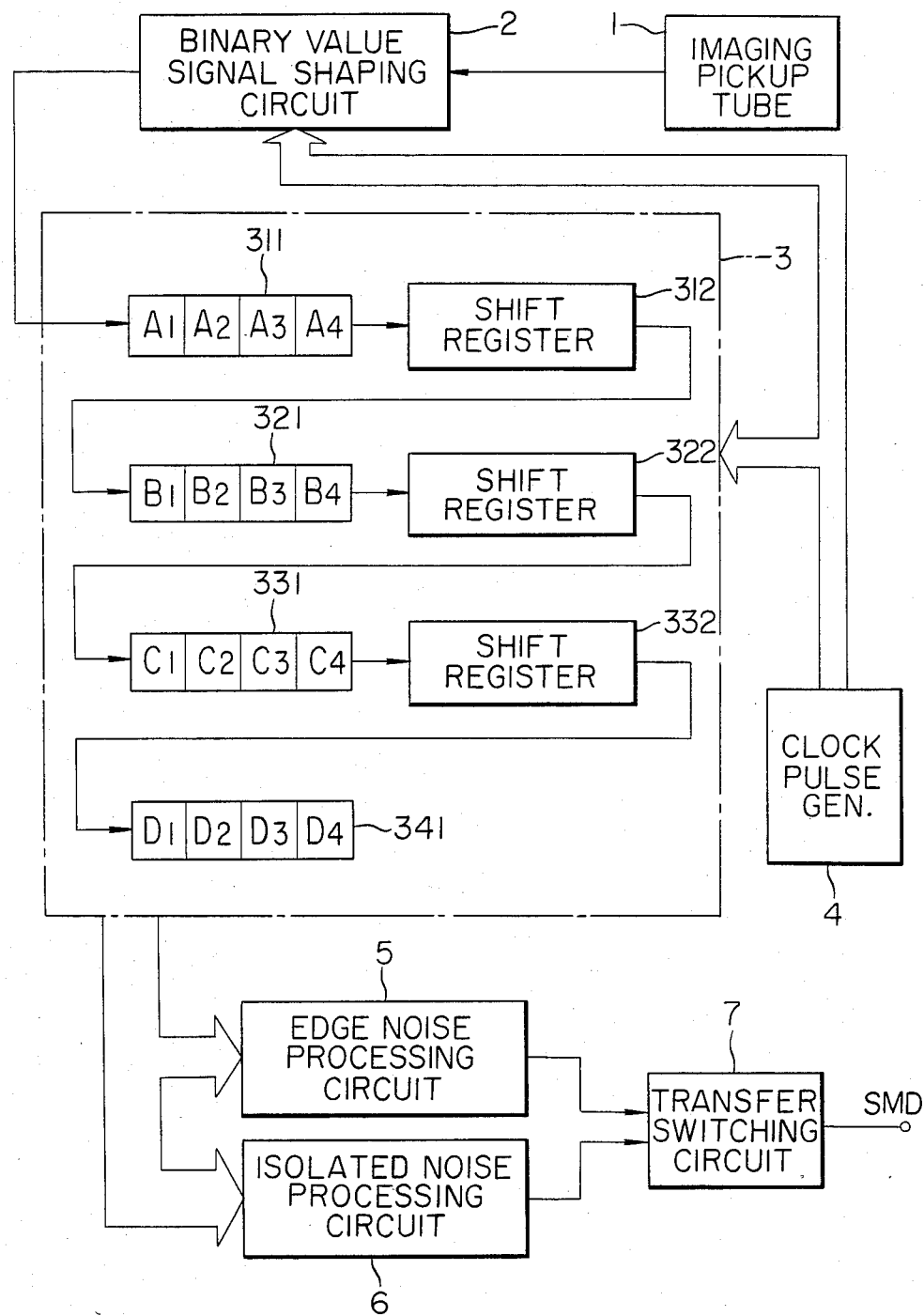
FIG. 1 is a block diagram of an embodiment of the present invention.

Now the present invention will be clarified in detail by embodiments thereof shown in the attached drawings. FIG. 1 is a block diagram of a smoothing apparatus embodying the present invention, wherein an imaging pickup tube 1 supplies analog signals of an original image to a binary signal shaping circuit 2, which generates binary signals by sampling the analog signals for a horizontal scanning period of said imaging tube 1 in response to clock signals supplied from a clock generator 4 and transforming said analog signals into binary signals at a predetermined threshold value. The binary signals thus obtained are supplied to a shift register array 3, which is composed of 4-bit shift registers 311, 321, 331 and 341 and shift registers 312, 322 and 332. The sum of the number of bits of the shift registers 311 and 312; 321 and 322; or 331 and 332 is selected equal to the number of pixels in a horizontal scanning line of the imaging tube 1, and the shift registers 311, 312, 321, 322, 331, 332 and 341 are serially connected in this order. The binary logic signal in each bit of said shift registers is shifted to the adjacent bit in response to a clock signal from the clock generator 4. In this manner the shift register array 3 extracts binary signals of $4 \times 4$ bits A1, A2, A3, A4, B1, B2, B3, B4, C1, C2, C3, C4, D1, D2, D3 and D4 corresponding to a rectangular partial area of $4 \times 4$ pixels.

The shift register array 3 supplies the binary signals of $3 \times 3$ bits A1, A2, A3, B1, B2, B3, C1, C2 and C3 out of the aforementioned $4 \times 4$ bits to an edge noise processing circuit 5, and supplies the binary signals of said 4×4 bits to an isolated noise processing circuit 6. The circuits 5, 6 process the entered binary signals and supply the result of said processing to a transfer switching circuit 7, which thus provides the logic value, i.e. the smoothed output signal SMD of the bit B2 from which the edge noise and isolated noise have been removed.

In this manner the present embodiment is designed to determine the logic value, after removal of the edge noise and the isolated noise, of a bit B2 positioned in the aforementioned 4×4 bits extracted by the shift register array 3, wherein the logic values of the remainder of said 4×4 bits are utilized as data for determining the logic value of the bit B2. After the above-mentioned step, the bit B2 receives the binary signal of a new pixel in response to a clock signal from the clock generator 4.

In the following the aforementioned processing circuits 6, 7 will be explained further in relation to the attached drawings.

FIG. 2 shows the relationship between the partial area of 3×3 pixels utilized in the edge noise processing circuit 5 and the bits of the aforementioned shift registers. As already explained, the partial area constitutes a part of the area of 4×4 pixels extracted by the shift register array 3. For the purpose of brevity, the partial area shown in FIG. 2 is selected corresponding to the bits A1, A2, A3, B1, B2, B3, C1, C2 and C3. The processing circuit 5 determines the logic value of the bit B2 corresponding to the central pixel in said partial area, in relation to the pattern of the surrounding peripheral 8 bits A1, A2, A3, B1, B3, C1, C2 and C3. The determination is conducted according to the majority (prevailing) rule that said logic value is selected as "1" regardless of the logic value of the bit B2 corresponding to the central pixel if the number of bits "1" is larger than that of bits "0" in the 8 surrounding bits, and the logic value is selected as "0" if the number of bits "0" is larger than or equal to that of bits "1". Consequently the processing circuit 5 provides a logic "1" for the bit B2 corresponding to the central pixel for a bit pattern in the partial area as shown in FIG. 3A, and provides a logic value "0" for a bit pattern shown in FIG. 3B. However, in case of a bit pattern as shown in FIG. 4A, the central pixel has a very important significance since a logic value "0" in the bit B2 corresponding to the central pixel will suggest a pattern as shown in FIG. 4B, while a logic value "1" in said bit B2 will suggest a pattern as shown in FIG. 4C. Hereupon, said logic value is selected as "0" or "1" respectively when the light or dark area occupies a majority in an image. A similar situation also occurs in a bit pattern shown in FIG. 5A, wherein the expected pattern is as shown in FIG. 5B or 5C according to the logic value of said bit B2. All of 18 similar cases are enumerated in FIGS. 6A-6R. In the bit patterns shown in FIGS. 6A-6H, the estimated original pattern in the partial area can be determined according to the logic value of the bit B2 as either one of the patterns shown in FIGS. 4B and 4C. In the bit patterns shown in FIGS. 6I-6P, the estimated original pattern can be determined according to the logic value of the bit B2 as either one of the patterns shown in FIGS. 5B and 5C. Also in the bit pattern shown in FIG. 6Q or 6R, a logic value "1" (or "0") in the bit B2 indicates the presence of a certain original pattern in the partial area, while a logic value "0" (or "1") in said bit B2 suggests the presence of noise. In observing an IC pattern in a limited partial area in the order of 3×3 pixels, consideration can be concentrated upon certain limited cases such as a vertical, horizontal or diagonal linear edge, and edges mutually crossing at 90° or 135°. Consequently, when a bit pattern is detected indicating a pattern like a diagonal linear edge or edges mutually crossing at 90° or 135°, the aforementioned majority rule is not followed but the logic value entered into the bit B2 corresponding to the central pixel is outputted without processing. In this manner the logic processing conducted by the processing circuit 5 generally follows the majority rule that the logic value of the central pixel in the partial area of 3×3 pixels is determined according to the majority of logic values "1" or "0" in the 8 surrounding pixels in the partial area, but outputs the entered logic value for the central pixel as it is only in the case of certain particular bit patterns in which the central pixel has a very large significance.

FIG. 7 shows a circuit structure of the processing circuit 5 for conducting the aforementioned logic processing.

8-bit signals corresponding to the 8 surrounding pixels of the 3×3 pixel area are supplied as address signals to a read-only memory 9, which stores logical values so as to apply a signal "1" or "0" to a majority output line 10 and a signal "1" or "0" to a switching output line 11 for the aforementioned bit patterns to be determined by the majority rule and for the aforementioned particular bit patterns.

More specifically, said read-only memory (ROM) 9 requires a memory capacity of 256×2=512 bits corresponding to 256 bit patterns for 8-bit addressing. The first page of 256 bits in the memory addressed by 8-bits stores the majority decisions "1" and "0" at the addresses corresponding to bit patterns to be judged by majority rule. Also the second page of 256 bits in said memory similarly addressed by 8-bits stores "1" at the addresses corresponding to the aforementioned particular bit patterns and "0" at the addresses corresponding to the bit patterns to be judged by the majority rule.

The first-page memory provides a logic value constituting the majority output signal on the output line 10, while said second-page memory provides a logic value constituting the switching output signal on the output line 11. A latch 12, for example composed of a shift register, receives the output signals on the lines 10, 11 and a binary signal of the bit B2 corresponding to the central pixel. The switching output signal on the line 11 introduced into said latch 12 selects the binary signal of the bit B2 or the majority output signal by means of an inverter 13 and AND gates 14A, 14B, thereby outputting an edge noise smoothed signal ESM from an output port 16. A switching output signal on the line 11 of the "1" level opens the AND gate 14B to output the logic value of the bit B2 as the signal ESM from output port 16, while the switching output signal on the line 11 of the "0" level outputs the logic value of the majority output signal on the line 10 as the signal ESM. The signal ESM is supplied to the transfer switching circuit 7 shown in FIG. 1.

FIG. 8 shows a partial area of 4×4 pixels used in the isolated noise processing circuit 6. When three or more pixels of the same logic value are present in the bits B2, B3, C2 and C3 corresponding to the central 2×2 pixels in the partial area and all the surrounding 12 pixels have a logic value different from that same logic value, the processing circuit 6 determines that said three or more pixels correspond to a small isolated pattern and provides the logic values of the pixels as they are. On the other hand, when the isolated pattern consists of two or less pixels, the circuit 6 identifies the pattern as noise and provides logic signals the same as those of the surrounding 12 pixels. More specifically the circuit 6 provides a logic value "1" for the bit B2 when central 2×2 bit patterns as shown in FIGS. 9A-9E, are all surrounded by twelve "0" bits, or a logic value "0" for the bit B2 when central 2×2 bit patterns shown in FIGS. 9F-9J are surrounded by twelve "1" bits. For other 2×2 bit patterns, circuit 6 provides logic values the same as those of the surrounding twelve bits as the smoothed binary signals.

FIGS. 10-12 show an example of circuit structure of the isolated noise processing circuit 6. FIG. 10 shows a circuit for detecting if 12 bits corresponding to the surrounding 12 pixels in the 4×4 partial area represent the same logic value. An AND gate 17A detects that the binary signals A1-A4, B1, B4, C1, C4 and D1-D4 representing the surrounding 12 bits are of the logic level "1" and outputs an output signal "1" to the output terminal SEL0. The binary signals of the surrounding 12 bits are also supplied, after inversion by inverters 25, to an AND gate 17B, which thus determines that the binary signals of the surrounding 12 bits are at the logic level "0" and outputs an output signal "1" to the output terminal SEL1.

FIG. 11 shows a circuit for outputting an output signal SM0 of a logic value "0" or "1" respectively when the central 2×2 bits B2, B3, C2 and C3 contain 3 or more "0" signals or 2 or less "0" signals. Each of AND gates 18A, 18B, 18C, 18D receives 3-bit binary signals selected from the 4 bits B2, B3, C2 and C3 after inversion by inverters (not shown). Consequently the AND gate 18A outputs an output signal "1" for the bit pattern shown in FIG. 9G or 9F. The AND gate 18B outputs an output signal "1" for the bit pattern shown in FIG. 9H or 9F. The AND gate 18C outputs an output signal "1" for the bit pattern shown in FIG. 9I or 9F. The AND gate 18D outputs an output signal "1" for the bit pattern shown in FIG. 9J or 9F. A NOR gate 19 outputs a signal SM0 of the level "0" in response to a logic signal "1" supplied from either of the AND gates 18A-18D, or a signal SM0 of the level "1" in response to the logic signals "0" received from all of said AND gates.

FIG. 12 shows a circuit for outputting an output signal SM1 of the logic value "1" or "0" respectively when the central 2×2 bits contain 3 or more "1" signals or 2 or less "1" signals. Each of AND gates 21A, 21B, 21C and 21D receives three binary signals selected from the 2×2 bits. Consequently the AND gate 21A outputs a logic value "1" in response to a bit pattern shown in FIG. 9A or 9B. The AND 21B outputs a logic value "1" in response to a bit pattern shown in FIG. 9A or 9C. The AND gate 21C outputs a logic value "1" in response to a bit pattern shown in FIG. 9A or 9D. Also the AND gate 21D outputs a logic value "1" in response to a bit pattern shown in FIG. 9A or 9E. An OR gate 20 outputs an output signal SM1 of the level "1" in response to a logic value "1" supplied from either of said AND gates 21A, 21B, 21C and 21D, or an output signal SM1 of the level "0" in response to a logic value "0" supplied from all of the AND gates.

In response to the aforementioned output signals SEL0 and SEL1, the switching circuit 7 selects either the output signal ESM from the processing circuit 5 or the output signals SM0, SM1 from the processing circuit 6 as the output signal SMD.

FIG. 13 shows a logic table of the switching circuit 7 shown in FIG. 1. The output signal SMD from the switching circuit 7 constitutes the final smoothed output signal determined through the processing circuits 5, 6. When the signals SEL0 and SEL1 are both "0" corresponding to the absence of an isolated pattern in the 4×4 pixel area, the output signal ESM from the processing circuit 5 is selected. The output signal SM0 is selected when the signal SEL0 is "1" indicating that the aforementioned surrounding 12 bits constitute a bright area having a logic value "0". Also the output SM1 is selected when the signal SEL1 is "1" indicating that the surrounding 12 bits constitute a dark area having a logic value "1". The signals SEL0 and SEL1 can not assume the level "1" simultaneously. In the logic table of FIG. 13 the mark "X" indicates that the logic value may be either "0" or "1". FIG. 14 shows an embodiment of the switching circuit 7 corresponding to the logic table of FIG. 13. In the circuit 7 a latch 28 is for example composed of a shift register in the same manner as the aforementioned latch 12, in order to synchronize the signals ESM, SM0, SM1, SEL0 and SEL1. A gate 30 is opened to output the signal ESM when the signals SEL0 and SEL1 are both at "0". An AND gate 26A is opened to output the signal SM0 when the signal SEL0 is at "1". An AND gate 26B is opened to output the signal SM1 when the signal SEL1 is at "1". An OR gate 27 outputs a final smoothed output signal SMD of the level "1" in response to an output signal "1" from either of the gates 30, 26A and 27A.

In order to facilitate the understanding of the smoothing function of the aforementioned circuits, there will now be considered the smoothing operation on a binarized image as shown in FIG. 15.

In this example consideration will be given only to an area of 12×12 pixels extracted from a mask or reticle pattern imaged by the imaging pickup tube 1, the area containing patterns A and B. The hatched pixels constitute the dark area corresponding to the logic value "1", and other pixels constitute the bright area corresponding to the logic value "0". The pattern A, originally an L-shaped pattern, is associated with edge noise $a_1$, $a_2$ and $a_3$ generated in the edge pixels at the digitization. The pattern B is an isolated small pattern formed upon the pattern on the mask or reticle.

Figure 16:
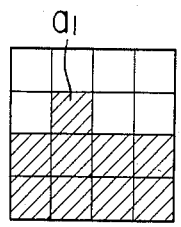
FIGS. 16, 17, 18, 19 20 and 21 are views showing $4 \times 4$ pixels extracted from the image of $12 \times 12$ pixels shown in FIG. 15.
Figure 17:
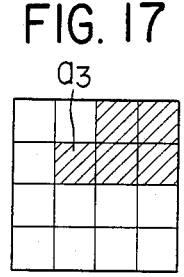

The aforementioned 4×4 pixel area moves stepwise in the image by the function of the shift register array 3. Consequently the bit B2 corresponding to the central pixel also moves pixel by pixel. FIG. 16 shows a state when the pixel $a_1$ of the pattern A is positioned at the bit B2. In this state, where the surrounding 12 pixels in the 4×4 area contain both levels "1" and "0", the edge noise processing circuit 5 provides the signal SMD of logic value "0" for the bit B2 corresponding to the central pixel in the 3×3 pixel area. Similarly the signal SMD assumes a logic value "0" for the pixel $a_2$ in the pattern A. Also in a state shown in FIG. 17 in which the pixel $a_3$ of the pattern A is positioned at the bit B2 corresponding to the central pixel, the processing circuit 5 provides the signal SMD of a logic value "0" according to the majority rule.

Figure 18:
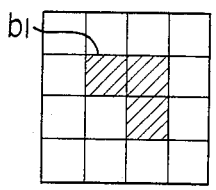
Figure 19:
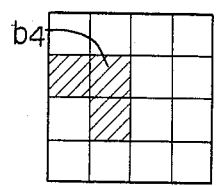
Figure 20:
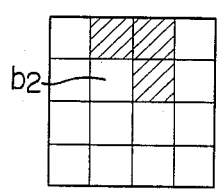
Figure 21:
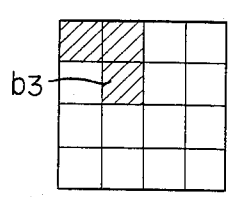

Then FIGS. 18-21 represent a state in which the pattern B becomes positiond inside the 4×4 pixel area because of the stepwise movement thereof. FIG. 18 shows a state in which the pixel $b_1$ of the pattern B is positioned at the pixel corresponding to the bit B2. In this case the isolated noise processing circuit 6 provides the signal SMD of a logic value "1". FIG. 19 shows a state attained by a stepwise displacement to the right of the 4×4 pixel area extracted by the shift register array 3, wherein the pixel $b_4$ of the pattern B is positioned corresponding to the bit B2. In this state the processing circuit 5 provides the signal SMD of a logic value "0". Upon further displacement of the area to a position shown in FIG. 20, the processing circuit 5 identifies a particular pattern and outputs the logic value "0" of the pixel $b_2$, now positioned at the bit B2, as the signal SMD. Upon next movement of the 4×4 pixel area to the right as shown in FIG. 21, the signal SMD assumes the logic value "0" according to the majority rule.

Figure 22:
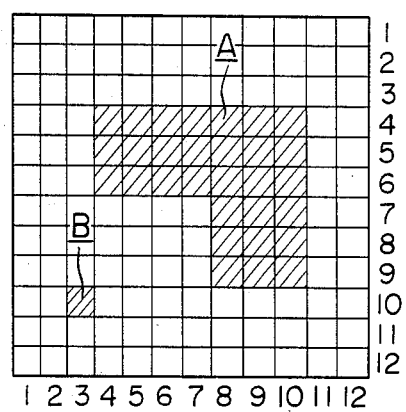
FIG. 22 is a view showing an image of $12 \times 12$ pixels binarized by the apparatus of the present invention.

The above-mentioned steps apply a smoothing function to the pattern shown in FIG. 15. A will be observed in FIG. 22 representing the smoothed output signals SMD for all the pixels, the noise components $a_1$, $a_2$ and $a_3$ of the pattern A are erased, and the isolated small pattern B is retained only by the pixel $b_1$.

As already explained in the foregoing, consideration for particular patterns encountered in the rectangular area defined by the shift register array 3 can be limited to a diagonal edge of 45° or mutually crossing edges at 90° or 135°, when removing the noise from binary image signals obtained from an IC pattern. Consequently, in case the 3×3 pixel area is expanded for example to a 5×5 pixel area for determining the logic value of a central pixel thereof, it will be understood that, if a 3×3 area inside said 5×5 area is considered, the particular, patterns illustrated in the embodiment are applicable.

We claim:

1. Two-dimensional pattern detecting apparatus adapted to divide a two-dimensional pattern into an area of at least 4×4 pixels and to represent the density of bright and dark for said pixels by binary logic values, comprising:

(a) register means for storing said binary logic values corresponding to said pixels;

(b) first processing means for comparing a pattern composed of 8 peripheral pixels in a partial area of 3×3 pixels within said area with predetermined patterns on the basis of 8 binary logic values stored in said register means corresponding to said 8 pixels and to output a binary signal of either a logic value stored in said register means corresponding to a central pixel of said partial area when the pattern composed of said 8 pixels coincides with one of said predetermined patterns, or of a logic value prevailing in said 8 binary logic values when the pattern composed of said 8 pixels does not coincide with any of said predetermined patterns;

(c) second processing means for outputting a binary signal of a logic value prevailing in the logic values stored in said register means corresponding to a partial area of 2×2 pixels including the central pixel of said partial area of 3×3 pixels;

(d) third processing means for outputting a first signal when the logic values stored in the register means corresponding to 12 pixels surrounding said partial area of 2×2 pixels are mutually identical and outputting a second signal when the logic values stored in the register means corresponding to said 12 pixels are not mutually identical; and (e) means for selecting either said binary signal from first processing means in response to said first signal, or said binary signal from second processing means in response to said second signal.

2. Two-dimensional pattern detecting apparatus according to claim 1, wherein said predetermined patterns comprise:

a first pattern in which one of the pixels positioned at a corner of said partial area of 3×3 pixels and 2 pixels adjacent to said corner pixel have the same logic value;

a second pattern in which said one and said 2 pixels in said first pattern and a pixel adjacent thereto have the same logic value; and a third pattern in which 4 pixels positioned at the 4 corners of said 8 pixels have the same logic value.

3. A method for transforming a two-dimensional pattern into a binary image by dividing the pattern into a predetermined number of pixels comprising:

(a) representing the two-dimensional pattern as binary logic values for the pixels in accordance with their density of bright and dark;

(b) storing the logic values;

(c) comparing a combination of logic values representing a pattern composed of 8 peripheral pixels in a partial area of 3×3 pixels within said two-dimensional pattern with combinations of logic values representing reference patterns;

(d) replacing the logic value of a central pixel of said partial area with a logic value determined by prevailing logic values of the 8 peripheral pixels when the logic value combination representing the pattern of said 8 pixels does not coincide with the logic value combination representing a reference pattern; and (e) maintaining the logic value of said central pixel when the logic value combination representing the pattern of said 8 pixels coincides with a logic value combination representing a reference pattern.

4. A method according to claim 3, wherein said reference patterns comprise:

a first pattern in which one pixel positioned at a corner of said partial area of 3×3 pixels and 2 pixels adjacent to said corner pixel have the same logic value;

a second pattern in which said one and said 2 pixels in said first pattern and a pixel adjacent thereto have the same logic value; and a third pattern in which 4 pixels positioned at 4 corners of said 8 pixels have the same logic value.

* * * * *